Patented July 10, 1951

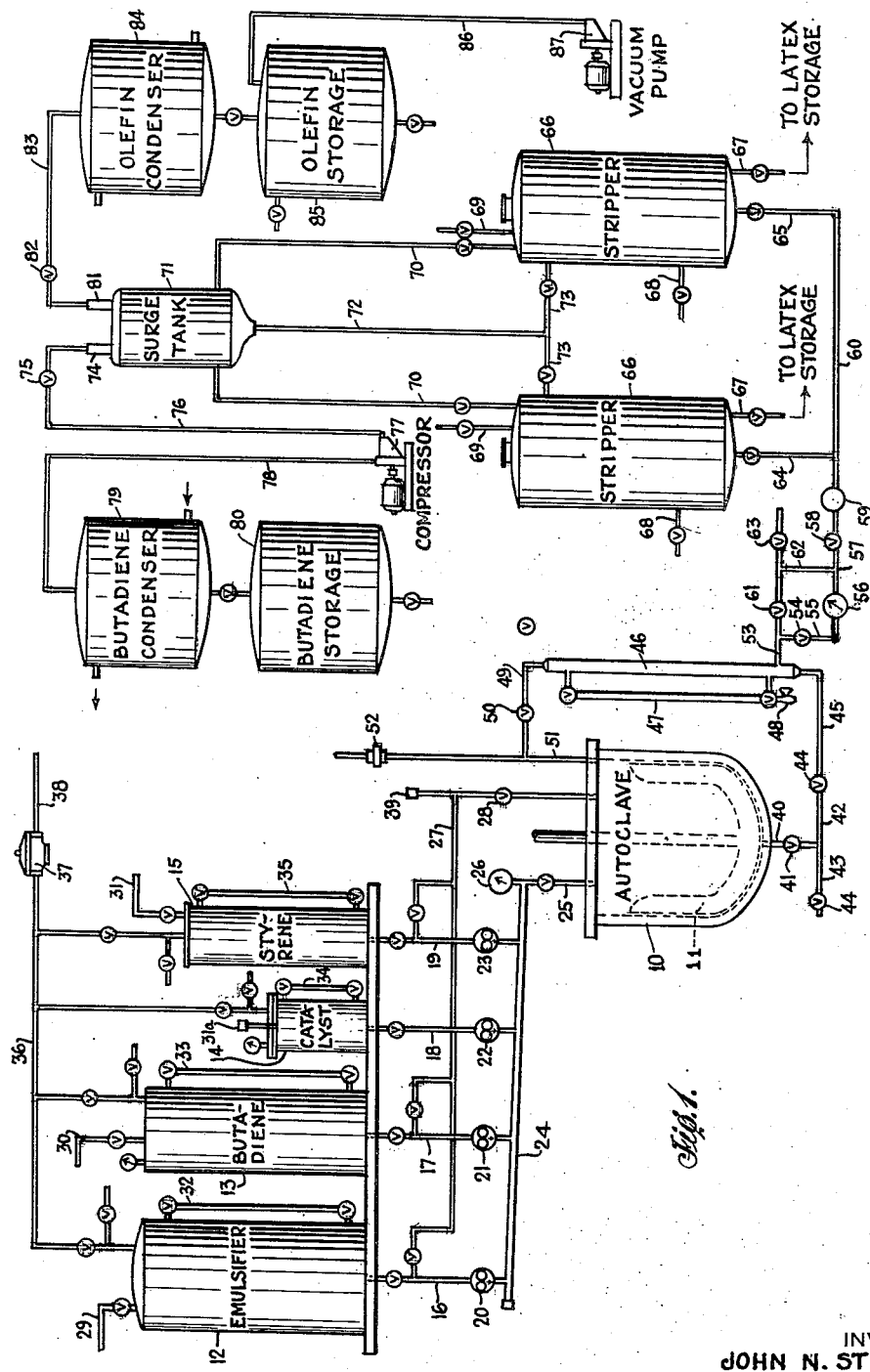

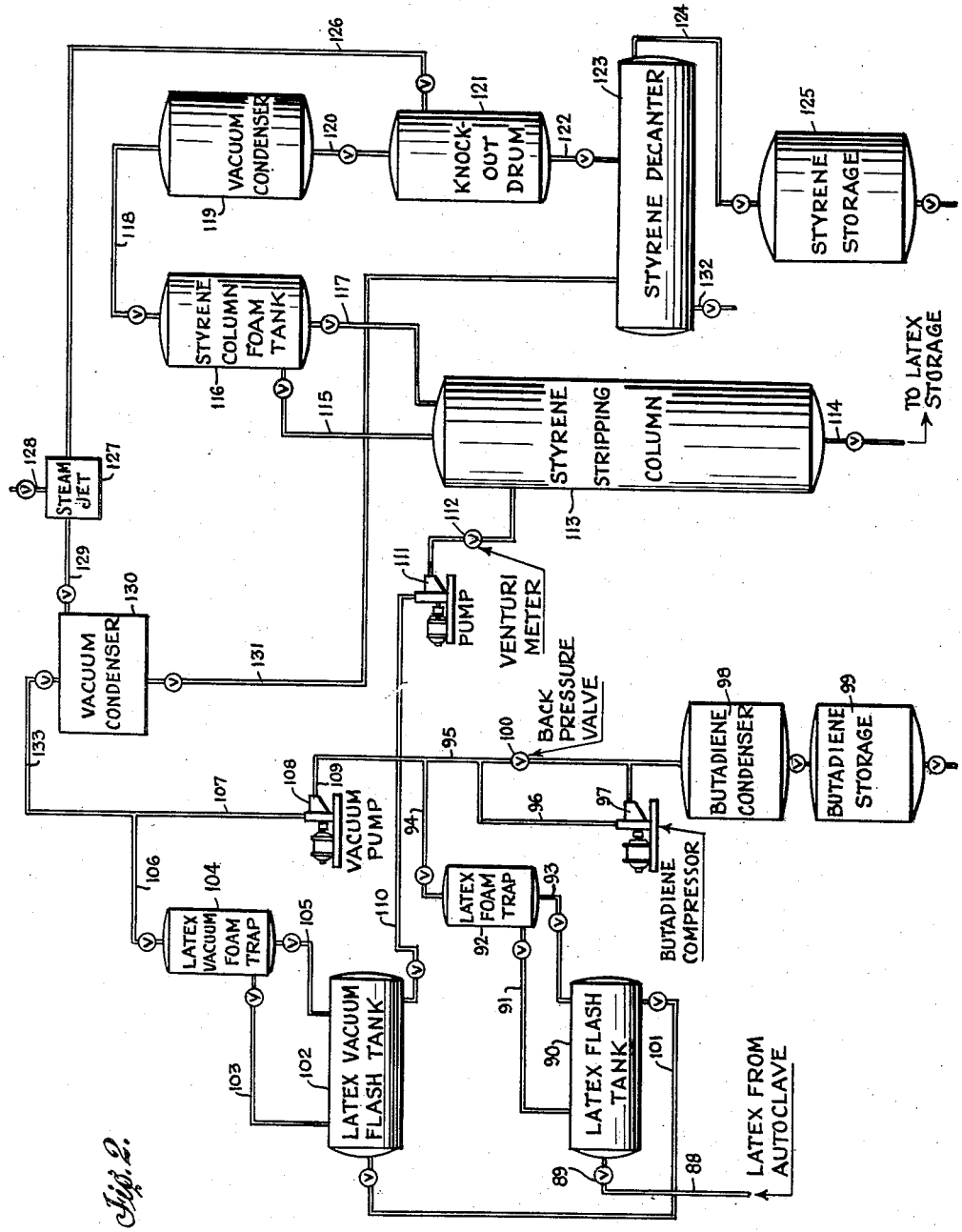

2,560,027

UNITED STATES PATENT OFFICE 2,560,027

CONTINUOUS POLYMERIZATION OF BUTADIENE AND STYRENE

John N. Street and Raymond F. Dunbrook, Akron, Ohio, assignors to The Firestone Tire & Rubber Company, Akron, Ohio, a corporation of Ohio Application August 8, 1947, Serial No. 767,504

2 Claims. (Cl. 260—83.7)

This invention relates to the manufacture of rubbery polymers of conjugated dienes and to interpolymers thereof with polymerizable vinyl compounds. The invention relates especially to the production of such rubbery polymers by the continuous polymerization of the monomers in a single polymerization vessel.

The manufacture of synthetic rubbers in this country has generally been carried out by batch processes. The batch process, as applied to emulsion polymerization, involves charging a polymerization vessel, usually an autoclave designed to operate under pressure, with an emulsion of the monomers and the necessary catalyst and modifier. At the end of a polymerization cycle, the charge is completely removed from the autoclave and processed thereafter. Then the autoclave is recharged with a fresh batch of reactants for a subsequent polymerization reaction.

Suggestions have been made to polymerize emulsions continuously by the use of a long tube as a polymerization vessel, in order to give sufficient opportunity to the monomers and the low molecular weight intermediates to react in order to produce a final product which has essentially a uniform "chain length." Others have suggested using several autoclaves in series, through which the polymerization emulsion is continuously pumped, in order to approximate the reaction time theoretically afforded by the long tube, mentioned above. A disadvantage of these suggestions is that special polymerization reactors are necessary in case of the long tube process, and a large number of individual autoclaves must be employed in accordance with the second suggestion.

It is an object of the present invention to provide a simplified process and apparatus for continuously manufacturing synthetic rubber. Another object is to provide a simplified, continuous process and apparatus especially suited to the use of activated polymerization systems. Other objects will be manifest in the description of the invention which follows, and in the accompanying drawings, in which:

Fig. 1 is a diagrammatic view of one embodiment of the apparatus of the invention employing alternate batch strippers; and Fig. 2 is a diagrammatic view of a continuous stripping system which may be employed alternatively to the batch strippers shown in Fig. 1.

Referring to Fig. 1 of the drawings, there is shown one embodiment of apparatus of the invention, substantially of pilot plant size. As the polymerization vessel, there is provided an autoclave 10, of twenty gallon capacity, suitably jacketed for controlling the temperature of the contents, and provided with a stirrer 11. Four supply tanks are provided as reservoirs or feed tanks for the materials necessary for the manufacture of the synthetic rubber. A tank 12, suitably of eighteen gallon capacity, is provided for storing a water solution of the emulsifying agent (soap), a tank 13, suitably of six gallon capacity, is provided for storing butadiene, a small tank 14, which may have a capacity of about two gallons, is provided for storing a solution of the polymerization catalyst, and a tank 15, suitably of two gallon capacity, is provided for styrene (in which may be dissolved a modifier). Tanks 12, 13, 14, and 15 are connected, respectively, to pipes 16, 17, 18, and 19, which in turn are respectively connected to metering pumps 20, 21, 22, and 23, for accurately feeding the polymerization materials to autoclave 10, through a manifold 24 and an autoclave inlet pipe 25. Suitable valves, as indicated on the drawing, are provided in each of the pipes just mentioned. A pressure gauge 26 is connected to the manifold 24 to aid in controlling the desired even, and safe, flow of materials to the autoclave. A by-pass loading line, indicated generally by numeral 27, communicates through suitable valves as indicated, to tanks 12, 13, and 15, and through a shut-off valve 28 to autoclave 10; the loading line 27 is of utility in initially loading autoclave 10 for beginning a continuous polymerization run or for other special purposes as will be apparent to those skilled in the art of polymerization.

The emulsifier tank 12 is provided with a valved inlet pipe 29, through which a solution of the emulsifying agent is supplied to the tank. Similarly, the butadiene tank 13 and styrene tank 15 are respectively provided with valved inlet pipes 30 and 31, and tank 14 is provided with an inlet pipe 31a sealed with a cap. Each of the supply tanks 12, 13, 14, and 15 is provided with suitable sight gauges identified, respectively, as 32, 33, 34, and 35. Each of the supply tanks is connected through suitable valved pipes to a manifold 36, leading to an air-reducing valve 37, which is connected through a pipe 38 to a source of nitrogen under pressure (not shown). Each of the pipes connected to manifold 36 is provided with a valved connecting pipe, as shown, through which material may be introduced into the supply tanks individually, or from which pressure may be equalized with atmospheric pressure. It is also noted that loading line 27 is provided at the top of vertical extension thereof with a pipe nipple 39 through which special materials may be charged into the autoclave 10, such as catalyst solution at the beginning of a run.

The means for continuously (or intermittently as desired) withdrawing material from the autoclave will now be described. A drain pipe 40 is connected to the bottom of autoclave 10, and communicates through a valve 41 to a pipe 42. Pipe 42 carries an extension 43 connected to a valve 44, through which samples may be intermittently withdrawn as desired. Pipe 42 communicates through a valve 44 and pipe 45 to a vertical output chamber 46, provided with a sight gauge 47, at the bottom of which is a petcock 48 from which samples may be drawn if desired. The top of chamber 46 is connected through an equalizer pipe 49, and valve 50 to a vertical pipe 51 opening into autoclave 10 and carrying at the top thereof a safety disc 52. Near the bottom of out-put chamber 46, there is attached an exit pipe 53, communicating through valve 54 and pipe 55 to a micro-cam valve 56 for controlling the rate at which latex is withdrawn from the autoclave 10. The valve 56 communicates through a pipe 57, a valve 58 and a view glass 59 to a manifold 60. A suitable by-pass valve 61 and a pipe 62 connects pipes 53 and 57, and a sampling valve 63 is provided in this by-pass line.

Means for batch stripping of unreacted monomers from the latex continuously supplied from autoclave 10 will now be described. Manifold 60 is connected through suitable valved pipes 64 and 65 to identical batch strippers 66, 66. Each stripper is provided with a valved drain pipe 67, a valved inlet pipe 68 and a second valved inlet pipe 69 for charging latex stabilizer in the top of each stripper. Each stripper 68 is connected through a valved pipe 70 to a common surge tank 71 for containing the foam which often accompanies butadiene vapor from a stripper 66 during the early part of a stripping operation. The bottom of the surge tank 71 is connected through a drain pipe 72 to identical valved return pipes 73, 73 for returning liquid back into strippers 66, 66.

One outlet 74 at the top of surge tank 71 communicates through a valve 75 and pipe 76 to a compressor 77 for compressing butadiene from the surge tank and delivering it through a pipe 78 to a butadiene condenser 79 and from there into a butadiene storage tank 80. Another outlet 81 at the top of surge tank 71 communicates through a valve 82 and a pipe 83 to an olefin condenser 84 and a storage tank 85 for storing recovered styrene. Tank 85 is in turn connected through a pipe 86 to a vacuum pump 87.

Referring to Fig. 2, there is shown means for continuously stripping unreacted monomers from the polymerized latex, and it is understood that the apparatus shown in Fig. 2 is alternative to the batch stripping apparatus shown in Fig. 1 and operatively described in connection with batch strippers 66, 66. Thus, latex from autoclave 10 may be supplied from micro-cam valve 56 into a pipe 88 at the lower lefthand corner of the apparatus shown in Fig. 2. The unstripped latex flows from pipe 88 through a valve 89 into a latex flash tank 90, from which butadiene vapor continually separates through a valved pipe 91 into a latex foam trap 92, any liquid carried into trap 92 being returned to tank 90 through a valved pipe 93. Butadiene leaves trap 92 through a pipe 94 communicating with a manifold 95 and a pipe 96 to a butadiene compressor 97. The compressed butadiene then feeds back into manifold 95 and to a butadiene condenser 98, from which the liquid butadiene flows into a butadiene storage tank 99. A back pressure valve 100 is placed in the line of manifold 95. Latex from which most of the butadiene has been removed, as just described, flows from tank 90 through a valved pipe 101 to a latex vacuum flash tank 102, and the remainder of the unreacted butadiene, now under a partial vacuum, as will be understood from the description hereinafter, leaves tank 102 through a valved pipe 103 and enters a latex vacuum foam trap 104, any liquid entering trap 104 being returned to tank 102 through a valved pipe 105. The butadiene separated from liquid in trap 104 is removed therefrom through a valved pipe 106 and connecting pipe 107, from which the butadiene passes through a vacuum pump 108 and a pipe 109 connected to manifold 95, in which the butadiene mixes with butadiene from tank 90 for condensing and storage.

The latex, which has been substantially freed of butadiene, flows from tank 102 through a valved pipe 110 to a pump 111 and through a Venturi meter 112 into the upper region of a continuous styrene stripping column 113. This column is similar to a conventional perforated plate rectifying column, and it is maintained under a vacuum so that styrene and water will vaporize from the latex as the latter trickles down through the column towards the bottom thereof. The completely stripped latex continually flows from the bottom of column 113 through a valved pipe 114 to latex storage (not shown). Vapor collecting in the upper region of column 113 travels therefrom through a valved pipe 115 into the bottom region of a styrene column foam tank 116, from which separated liquid flows back into the top of column 113 through a valved pipe 117. Vapors of styrene and water (containing small amounts of butadiene) flow from the top of foam tank 116 through a valved pipe 118 to a vacuum condenser 119, and from the discharge pipe 120 into a knock-out drum 121. Liquid styrene flows from the bottom of drum 121 through a pipe 122 into a styrene decanter 123. Liquid styrene collecting in decanter 123 is continually discharged therefrom through a pipe 124 into a styrene storage tank 125.

Vapor separating from the styrene liquid in drum 121 passes therefrom through a valved pipe 126 to a steam jet 127 for applying suction to knock-out drum 121; high pressure steam enters jet 127 through a valved pipe 128. Steam and water vapor containing small amounts of butadiene and styrene pass from jet 127 through a valved pipe 129 into a vacuum condenser 130. Liquid water containing small amounts of styrene flows from condenser 130 through valved pipe 131 back into styrene decanter 123. A valved discharge pipe 132 is attached to the bottom of decanter 123 for removal of separated water.

Uncondensed vapor from condenser 130 passes therefrom through a valved pipe 133 into pipe 107, for recovery of residual butadiene.

The following specific examples are provided to set out the invention more clearly. The examples, in which all parts are listed by weight, are disclosed in connection with the specific apparatus of the invention shown in Fig. 1 of the drawings.

*Example 1*

The basic polymerization formula, according to which a continuous polymerization run was made, is as follows:

FORMULA I

| Materials | Parts |
|---|---|
| Butadiene | 75 |
| Styrene | 25 |
| Dodecyl mercaptan | 0.5 |
| Water | 180 |
| Soap | 5 |
| Potassium persulfate | 0.3 |

Butadiene was charged into tank 13, styrene containing the modifier, dodecyl mercaptan, was charged into tank 15, a water solution of the catalyst, potassium persulfate, was charged through pipe 31a into tank 14, and a solution of the soap in the remaining water was charged through inlet pipe 29 into tank 12. The autoclave 10 was then given a "half-charge" of seven gallons of the various ingredients, making use of by-pass loading line 27, and finally introducing the required amount of catalyst solution through the pipe nipple 39, after which it was sealed with a suitable cap. The contents of the autoclave were then heated by means of the autoclave jacket to 132° F., and stirrer 11 was started. Metering pumps 20—23 were operated at a rate to deliver a total of about 1.8 gallons of materials per hour into autoclave 10. At the end of each eight-hour cycle, a sample of the latex was withdrawn through valve 63 and tested and analyzed to provide the data set out in Table I. It is noted that the average conversion was around 50% and the rubber was too soft and sticky to give desired physical properties, but this experiment proved that the apparatus was operative.

TABLE I
[Rates in gals./hr.]

| 8-Hr. Cycle | Emulsifier | Butadiene | Catalyst | Styrene | Total | Conversion, Per Cent |
|---|---|---|---|---|---|---|
| 1 | 0.88 | 0.62 | 0.169 | 0.185 | 1.85 | 42 |
| 2 | .88 | .62 | .163 | .185 | 1.85 | 63 |
| 3 | .86 | .60 | .158 | .174 | 1.79 | 54 |
| 4 | .86 | .59 | .160 | .179 | 1.79 | ---- |
| 5 | .89 | .58 | .145 | .166 | 1.78 | 46 |
| 6 | .88 | .57 | .161 | .160 | 1.77 | 44 |
| 7 | .90 | .60 | .160 | .165 | 1.82 | 48 |
| 8 | .87 | .59 | .161 | .164 | 1.78 | 50 |
| 9 | .89 | .54 | .157 | .156 | 1.74 | 48 |
| 10 | .88 | .61 | .161 | .176 | 1.83 | 50.5 |

Example 2

Another continuous run was made in the manner indicated in Example 1, except that the materials were supplied to the autoclave at a rate of approximately 1.4 gallons per hour. Data obtained upon samples removed at the end of each eight-hour cycle are set out in Table II. It is noted that the average conversion in this example was between 50 and 60%. The polymer was still too soft and sticky to give desired physical properties.

TABLE II
[Rates in Gals./Hr.]

| 8-Hr. Cycle | Emulsifier | Butadiene | Catalyst | Styrene | Total | Conversion % |
|---|---|---|---|---|---|---|
| 1 | 0.67 | 0.50 | 0.136 | 0.142 | 1.45 | 53 |
| 2 | .67 | .48 | .131 | .136 | 1.42 | 63 |
| 3 | .67 | .49 | .133 | .136 | 1.43 | 60 |
| 4 | .66 | .50 | .136 | .131 | 1.43 | 60.5 |
| 5 | .68 | .49 | .136 | .134 | 1.44 | 50 |
| 6 | .66 | .47 | .132 | .134 | 1.40 | 50.5 |
| 7 | .67 | .51 | .133 | .137 | 1.45 | 51 |
| 8 | .68 | .50 | .136 | .142 | 1.46 | ---- |

Example 3

Another continuous run was made in the manner indicated in Example 1, except that the input rate of materials to the autoclave was maintained at approximately one gallon per hour. The data on this run, shown in Table III, bring out the fact that after the polymerization had been operating for 15 hours and then through 56 hours, the conversion was substantially in the range of 60—72 per cent, and the polymer had plasticity comparable to that of commercial copolymers of this type. The physical testing data presented in Table III were obtained in accordance with a standard tire tread stock formula, and indicate that the polymer had fair physical properties.

The figures for extrusion plasticity were obtained in tests with an instrument of the type described in U. S. Patent 2,045,548 to J. H. Dillon et al. and known as the Firestone Extrusion Plastometer. The plasticity figure represents the time in seconds required to extrude a constant volume of rubber through a given opening by action of a piston activated by a constant pressure of 8¼ pounds' air, and at a constant temperature of 185° F.

TABLE III

| Hour Sample | Per cent Conversion | Extrusion Plasticity | Cure 50 minutes at 290° F. | | |
|---|---|---|---|---|---|
| | | | Modulus 400% | Tensile | Elongation |
| 7 | 52 | | | | |
| 15 | 70 | | | | |
| 25 | 72 | 5.4 | 1,500 | 2,400 | 420 |
| 32 | 69.5 | | | | |
| 40 | 64.5 | 3.8 | 1,350 | 2,175 | 370 |
| 48 | 62.5 | | | | |
| 56 | 59.0 | 2.8 | 1,725 | 2,150 | 470 |
| 64 | 51 | | | | |
| 72 | 46 | | too soft | | |

Example 4

Another continuous run was made as in Example 3, except that the liquid level in the autoclave was raised from 14–15 gallons of Example 3 to 18 gallons in this run, and kept at the latter level throughout the run. From the data set out in Table IV, it is noted that the conversion rose to substantially 60% after about 12 hours and then averaged about 70% throughout the rest of the run, ending after 152 hours. After equilibrium was reached in this run, the quality of the polymers was fairly satisfactory and of uniform properties.

TABLE IV

| Hour Sample | Per Cent Conversion | Extrusion Plasticity | 400% Modulus | Tensile | Elongation |
|---|---|---|---|---|---|
| 6 | too sticky | | | | |
| 12 | 58.5 | | | | |
| 14 | 67.0 | | | | |
| 16 | 72.5 | | | | |
| 24 | 77.0 | 5.6 | 2425 | 2425 | 400 |
| 32 | 76.0 | | | | |
| 40 | 75.0 | 3.0 | | 2400 | 380 |
| 48 | 72.0 | | | | |
| 56 | 70.0 | 3.0 | | 1925 | 290 |
| 64 | 71.5 | | | | |
| 72 | 66.5 | 5.2 | | 2100 | 350 |
| 80 | 67.0 | | | | |
| 88 | 67.0 | 3.6 | 2200 | 2500 | 440 |
| 96 | 68.5 | | | | |
| 104 | 69.0 | 5.0 | 2100 | 2600 | 450 |
| 112 | 69.5 | | | | |
| 120 | 70.0 | 6.0 | 2150 | 2150 | 400 |
| 128 | 66.5 | | | | |
| 136 | 68.0 | 6.0 | 2125 | 2125 | 400 |
| 144 | 68.0 | | | | |
| 152 | 67.0 | 2.7 | | 1475 | 330 |

It is obvious to one skilled in the art that the specific disclosures given above are for illustrative purposes only, and that many variations can be made to increase the rate of reaction (as by use of more catalyst or by substituting activated formulas for Formula 1, e. g., a redox formula). Also, variations in the temperature of the reaction and rate of flow through the autoclave can be readily adjusted, in accordance with the present disclosure, depending upon the specific polymerization formula employed and other factors herein indicated, as well as upon the desired characteristics of the synthetic rubber to be produced.

Other systems of monomers may be substituted for the butadiene-styrene system specifically disclosed as will be understood by those skilled in polymerizations.

The invention is defined in the appended claims.

What is claimed is:

1. Continuous method of manufacturing synthetic rubber, which includes continuously introducing 75 parts 1,3-butadiene, 25 parts styrene, 180 parts water, emulsifying agent and polymerization catalyst into a single reactor, continuously agitating the ingredients within the reactor, thereby maintaining the ingredients within the reactor in substantially uniformly dispersed condition, maintaining the temperature at 132° F. within the reactor, adjusting the rate of introduction of ingredients into the reactor to a constant rate producing a polymerization conversion in the range of 60-70%, continuously withdrawing from the reactor dispersion containing polymerized butadiene and styrene, unpolymerized butadiene and unpolymerized styrene, separating the butadiene from the dispersion by evaporation, recovering the separated butadiene by condensation, separately removing the styrene from the dispersion by distillation, and separately condensing the distilled styrene.

2. Continuous method of manufacturing synthetic rubber, which includes continuously introducing 75 parts 1,3-butadiene, 25 parts styrene, 180 parts water, 0.5 part dodecyl mercaptan, 5 parts soap and 0.3 part potassium persulfate into a single reactor, continuously agitating the ingredients within the reactor, thereby maintaining the ingredients within the reactor in substantially uniformly dispersed condition, maintaining a constant temperature of 132° F. within the reactor, adjusting the rate of introduction of ingredients into the reactor to a constant rate at which a conversion of the monomers butadiene and styrene to copolymerized butadiene and styrene is constant within the range of 66.5-70%, continuously withdrawing from the reactor dispersion containing polymerized butadiene and styrene, unpolymerized butadiene and unpolymerized styrene, separating the butadiene from the dispersion by evaporation, recovering the separated butadiene by condensation, separately removing the styrene from the dispersion by distillation, and separately condensing the distilled styrene.

JOHN N. STREET.
RAYMOND F. DUNBROOK.

REFERENCES CITED

The following references are of record in the file of this patent:

UNITED STATES PATENTS

| Number | Name | Date |
|---|---|---|
| 2,259,180 | Schoenfeld et al. | Oct. 14, 1941 |
| 2,363,951 | Fikentscher | Nov. 28, 1944 |
| 2,384,277 | Calcott et al. | Sept. 4, 1945 |
| 2,465,363 | Faragher et al. | Mar. 29, 1949 |

FOREIGN PATENTS

| Number | Country | Date |
|---|---|---|
| 517,951 | Great Britain | Feb. 13, 1940 |
| 679,897 | Germany | Aug. 18, 1939 |

OTHER REFERENCES

Chem. and Met. (November 1943) Flow Sheet on 5 and 6 pages of Kirkpatrick Article.